Figure 1:
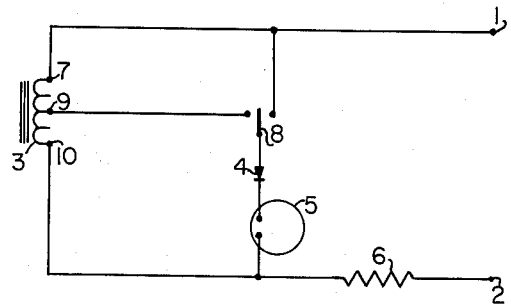

March 28, 1961     E. F. WRIGHT     2,977,532
ELECTRICAL MEASURING INSTRUMENT
Filed June 26, 1957

INVENTOR
E.F. WRIGHT
BY Jos.R.Scalzo
ATTORNEY

United States Patent Office 2,977,532
Patented Mar. 28, 1961

2,977,532
ELECTRICAL MEASURING INSTRUMENT
Edward Franklin Wright, 310 S. Ramsey St., Manchester, Tenn.
Filed June 26, 1957, Ser. No. 668,150
4 Claims. (Cl. 324—62)

The present invention relates to a simple electrical measuring or relay instrument with a high internal impedance for the measurement of, or responding to, alternating potentials without the use of electronic amplifying circuits.

It has always been desirable to construct voltmeters or potential relays with the highest possible internal impedance and an alternating-current voltmeter having 20,000, and more, ohms per volt internal resistance can be simply and inexpensively built by the amplication of a permanent-magnet ammeter, transformer-type coil, rectifier and resistors. Heretofore alternating current voltmeters, not having electronic amplifying features, have had relatively low internal impedance in the order of 1500 ohms per volt. The transformer-type coil and rectifier results in higher current through the meter than is drawn from the source being measured which permits a corresponding increase in internal impedance of the meter circuit. The meter may be replaced by a current relay to make a high impedance relay circuit.

A chopper circuit, which produces impulses by means of a gaseous discharge tube and a condenser, added to the basic alternating-current instrument circuit of this invention will result in a voltmeter or relay capable of responding to direct-current voltages and an instrument having the same high internal impedance. By the further addition of a battery, the sensitive direct-current voltmeter circuit can be used to measure high resistance values in the order of several thousand megohms. A low resistance in the order of microhms can be measured by connecting the unknown resistance to be measured in series with a low resistance turn around the transformer iron core.

The main object of this invention is to provide an expensive and simple instrument having a high internal impedance for responding to both alternating and direct voltages. High internal impedance is desirable to avoid an excessive drain on the voltage and current to be measured.

A further object is a meter having the same numerical scale for the measurement of both alternating and direct voltages.

A still further object of this invention consists of an instrument circuit in which higher currents flow through the indicating meter or relay element than flow from the source to be measured. Higher current flows through the indicating meter or relay element than flows from the source to be measured because of auto-transformator action when the meter or relay is connected across the secondary of the auto-transformer, and because pulses of high current pass through the meter due to energy stored in the transformer, and the condenser when used for direct current.

Another object of this invention is to provide an ohmmeter by the addition of a battery which will measure extremely high and extremely low values of resistance.

Other objects of this invention will become manifest as further disclosure is made.

Referring now to the accompanying drawings:
Figure 1 is a schematic representation of the alternating-voltage instrument,
Figure 2 shows in schematic form the addition of the chopper circuit for use with direct voltages,
Figure 3 shows in schematic form a means for measuring both high and low resistances by the addition of a battery in the circuit of Figure 2.

Referring now to Figure 1, numerals 1 and 2 are the terminals of the instrument to which the potential to be measured is attached. Numeral 3 is an inductance coil similar to some auto-type transformers having mid-taps such as 9. A two-winding transformer may be used having a primary coil corresponding to terminals 7 and 10 and a secondary coil corresponding to terminals 9 and 10. A rectifier 4 connected in series with a direct-current meter or relay 5 is connected across the secondary terminals 9 and 10 of coil 3 through switch 8, or may be connected across the terminals 7 and 10 of coil 3 through switch 8. Several times (two, three and more times) as much current will flow through the meter or relay 5 when the rectifier and 5 are connected across 7 and 10 of coil 3 than when a rectifier is connected in place of coil 3 as is now common design. By connecting the rectifier and 5 across the 9 and 10 terminals of coil 3 a further increase in current will flow through the meter or relay 5, and will be proportional to the ratio of turns in the primary coil with terminals 7 and 10 and the secondary coil with terminals 9 and 10. Numeral 6 is a resistance that may be 20-, 50-thousand, or more, ohms per volt of the alternating-voltage to be measured across terminals 1 and 2 when 5 is a microammeter.

Figure 2:
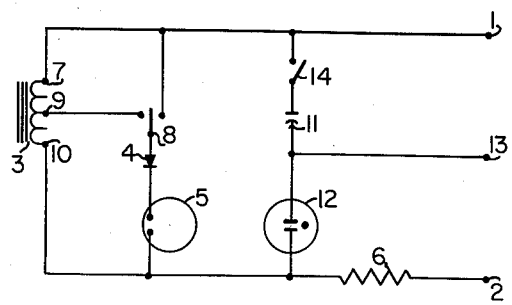

Figure 2 is the same circuit as shown by Figure 1 except that a condenser 11 and gaseous discharge tube 12, both connected in series and across the outside terminals of coil 3, is added for the purpose of making a pulsating voltage of a direct voltage applied to terminals 13 and 2. The terminal 13 is attached between 11 and 12. The pulsating voltage is caused by the condenser charging through the meter and coil without the gaseous discharge tube conducting until the voltage across the gaseous discharge tube reaches a conducting value; then the gaseous tube conducts, which discharges the condenser. The circuit of Figure 2 becomes a sensitive direct-current instrument when the direct voltage to be measured is applied across terminals 13 and 2. Switch 14, when open, results in a circuit similar to the Figure 1 circuit of an alternating-current instrument.

Figure 3:
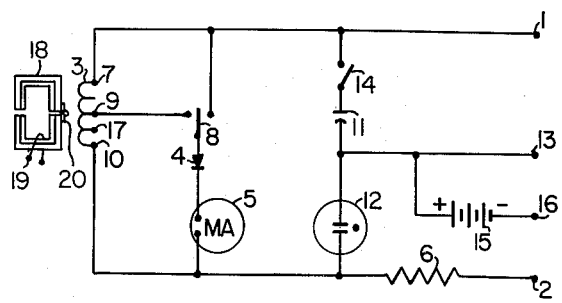

Figure 3 shows the addition of a battery 15 making an ohmmeter capable of measuring high resistance (megohms) values when the resistance to be measured is connected across terminals 16 and 2.

The said ohmmeter circuit may be used for measuring low resistance (microhms) by connecting terminals 2 and 16, and proceeding one turn of low resistance compared to the resistance to be measured, numeral 19, around the iron core of coil 3, and connecting the resistance to be measured across the turn 19.

Iron 18 may be hinged as indicated by 20, similar to a clamp-on type ammeter, permitting iron 18 to encircle a straight or unbroken circuit or conductor for the purpose of measuring the resistance of said circuit or conductor.

What has been shown and described in the preceding discussion are simple, practical and operable devices for accomplishing the purposes of this invention. It is manifest that certain alternations can be made and still remain within the scope of the present invention for which the following is claimed.

I claim:
1. In an electromotive force measuring device of the class described comprising a meter circuit, said meter circuit containing a meter and a half wave rectifier connected in series, a transformer coil, a portion of said coil connected in parallel with said meter circuit, a chopper circuit connected in parallel with the whole of the transformer coil, the chopper circuit including a gaseous discharge tube and condenser connected in series, a high resistance, one terminal of said high resistance connected to the point at which the gaseous discharge tube and said transformer coil connects, the other terminal of said high resistance and the other terminal between the said gaseous discharge tube and said condenser providing two terminals for the direct electromotive force to be measured.

2. The same as claim 1 with the addition of a branch circuit comprising a direct current source and an unknown resistance connected in series, the terminals of said branch circuit connected to the terminals described in claim 1 connecting to the electromotive force to be measured, for the purpose of measuring the magnitude of said unknown resistance by the meter indication.

3. The same as claim 2 with the addition of an electrical connection across the terminals used for the said unknown resistance, the transformer coil having a magnetic core, a low resistance open end turn encircling said magnetic core, the open ends of the said low resistance open end turn providing terminals for connection to an unknown resistance for the purpose of measuring the resistance magnitude of said unknown resistance.

4. The same as claim 3 with the addition of means for opening the magnetic core of the transformer coil to admit a conductor which will encircle the said magnetic core when the said magnetic core is a closed loop, the said encircling conductor being in position to have its resistance magnitude measured by the indication of the measuring instrument.

References Cited in the file of this patent
UNITED STATES PATENTS

| | | |
|---|---|---|
| 2,210,685 | Oman | Aug. 6, 1940 |
| 2,808,566 | Douma | Oct. 1, 1957 |